United States Patent Office 3,676,106
Patented July 11, 1972

3,676,106
ION EXCHANGE PROCESS FOR THE RECOVERY
OF METALS WITH CATION EXCHANGE AGENTS
Wayne C. Hazen, Denver, Colo., assignor to
Hazen Research, Inc., Golden, Colo.
No Drawing. Filed Sept. 10, 1970, Ser. No. 71,278
Int. Cl. C22f 15/08, 59/00
U.S. Cl. 75—101 R          12 Claims

ABSTRACT OF THE DISCLOSURE

A method for recovering metal values from aqueous solution with a hydrogen ion exchange agent in which the acidity of the aqueous solution is controlled without neutralizing the acid formed therein, the method comprising alternately contacting the aqueous solution with (1) the hydrogen ion exchange agent to replace hydrogen ions on the agent by metal ions and (2) a solvent extractant for hydrogen ions to recover hydrogen ions from the aqueous solution until substantially all of the metal values are recovered from the aqueous solution.

---

The invention relates to the recovery of metal ions in solution with a hydrogen ion exchange agent; more particularly, it relates to an improvement in such a process which provides for control of the pH of the solution.

SUMMARY OF THE INVENTION

It has become important to recover metals from their ores in high purity form as inexpensively as possible to meet present commercial standards. Furthermore, as ores become scarcer, processes for high yield recovery of metals from low grade ores must be highly efficient to make them economically feasible. These requirements have led to the use of highly refined solvent extraction and ion exchange techniques for the recovery of metals from their ores.

The feed solution for many recovery processes is ordinarily an aqueous solution formed by dissolving the metal ore in dilute acid. In the ion exchange recovery processes, ordinarily the solution is contacted with a liquid-liquid or liquid-solid cationic exchange agent, the hydrogen ions on the agent being exchanged for metal ions in solution with the metal being deposited on the ion exchange agent. The metal is then stripped from the ion exchange agent and recovered by standard techniques from the stripping solution. The regenerated ion exchange agent is then returned to the process.

In the case of copper, for example, it has been common practice to dissolve the copper mineral with dilute sulfuric acid. The resulting leach liquor is commonly run through tanks containing iron scrap or tin cans, thereby precipitating the copper as a sludge called "cement copper." This impure product must then be smelted and refined to make the standard high purity copper sold commercially. A method for producing high purity copper and avoiding the smelting and refining steps is the use of a cationic ion exchange agent to remove copper from the impure leach liquor and concentrate it to a copper sulfate solution strong enough (30 to 50 grams per litre of copper) so that it may serve directly as feed to an electrolytic cell. Cation exchange agents for accomplishing this are available on the market, an example being a material sold by the General Mills Company under the trade name of "LIX–64," a 2-hydroxy benzophenoxime. The method for making these compounds is disclosed in U.S. Patent No. 3,428,449.

One of the disadvantages of processes for extracting metal from acid leach liquors with a cationic exchange agent is that the acidity of the solution is progressively increased by the exchange of metal ions in the solution for hydrogen ions on the exchange agent as the process proceeds. For effective recovery of metal ions from the solution its acidity must be held at a low value, so that additional procedure is necessary to maintain the acidity below a certain point. Using copper as an example, LIX–64 will effectively extract copper from solutions having a pH value of more than 1.5 (acid content lower than about 5 grams per litre), but the efficiency of this agent decreases at lower pH values. Like conditions govern the recovery of other metals from their aqueous solutions by ion exchange techniques using a hydrogen ion exchange agent.

Control of the acidity of the solution of metal ions has been accomplished in the past by neutralizing the solution by the addition of alkaline reagents, such as, ammonia or lime. This increases the overall cost of the recovery process due to the cost of the neutralizing reagents which are added and also because of the loss of acid through neutralization.

In accordance with this invention, the acidity of the leach solution is controlled during the ion exchange recovery process by contacting the leach solution with a solvent extractant for acid when the acidity of the leach solution has reached a point at which the recovery of metal ions is no longer efficient. In other words, the process of the invention comprises alternately contacting the leach solution with a cation exchange agent and a solvent extractant for hydrogen ions until substantially all of the metal ions are removed from the solution. The metal can be recovered from the ion exchange agent and the agent reused in the process. The recovered acid is stripped from the solvent extractant with water and the solvent extractant reused. The water strip containing acid is returned to the process for further leaching of copper ore, after first concentrating it if necessary.

The present invention can be utilized to control the acidity of the leach solution for any metal which can be recovered therefrom with a hydrogen ion exchange agent. Obviously, if a metal is not recoverable from leach solutions by a cation exchange agent which exchanges hydrogen ion for metal ion, the invention has no application.

The cation or hydrogen ion exchange agent for the particular metals will vary depending upon the efficiency required. For example, for the recovery of copper, LIX–64 is presently preferred. Other cation ion exchange agents may be used for various metals. Liquid cation exchangers may be used, such as, di-2-ethyl-hexyl phosphoric acid and other organic esters of phosphoric acid, carboxylic acids with various hydrocarbon chains, di-nonyl naphthalene sulfonic acid and strong, intermediate and weak cation exchange resins, such as Doulite C–20, Dowex 50W, Amberlite 200, Amberlite IRC–84 and Doulite ES–63, all of these resins being capable of exchanging hydrogen ions for the metal ions in solution.

The ion exchange agent used should, of course, be immiscible with the leach solution and must not form interfering complexes with the required metal complexes.

The preferred solvent extractants for hydrogen ions are the long chain secondary and tertiary amines used conventionally for extracting acids from solution. They conform generally to the formulas:

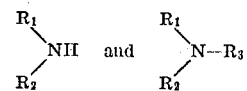

wherein $R_1$, $R_2$, and $R_3$ are aliphatic chains (straight or branches) having from 6 to 18 carbon atoms.

The invention is illustrated by the following examples which are illustrative but not limiting thereof as the invention is not restricted in its application to recovery of any particular metal ion.

The following example illustrates the use of the invention as applied to the recovery of copper from a dilute sulfuric acid leach liquor, the pH being maintained at the required level without neutralization of acid. "LIX-64" was used as the cation exchange agent.

In the examples which follow and throughout the specification metal percentages are given in weight percentages while solution percentages are based on volume percentages, i.e., "10% LIX-64 in kerosene" means 10% by volume of LIX-64 to kerosene.

EXAMPLE I

In the following a copper leach solution was prepared by leaching a one percent copper ore containing oxide copper minerals with dilute sulfuric acid and filtering the slurry to obtain clear solution. The solution analyzed 7.5 grams per litre of copper, 10.0 grams per litre of free $H_2SO_4$, and 2.4 grams per litre of iron as ferrous sulfate. In the first test, recorded in Table 1, the free acidity of the solution was lowered to about 7 grams per litre by addition of ammonia. The solution was then fed to a four-stage countercurrent solvent extraction unit countercurrent to an organic phase composed of ten percent LIX-64 dissolved in kersosene. The analyses of the aqueous phase in each stage are shown in the following table.

TABLE 1

| Stage | Analysis of aqueous phase, g./l. | |
|---|---|---|
| | Copper | Sulfuric acid |
| 1 | 6.5 | 5.3 |
| 2 | 3.2 | 10.1 |
| 3 | 2.4 | 11.7 |
| 4 | 2.2 | 11.8 |

The results reported in the table show that the sulfuric acid content of the solution increased as the copper concentration decreased because of the exchange of copper ions for hydrogen ions. It can also be seen that only about 70 percent of the copper was extracted.

The same feed solution was fed to a four-stage ion exchange-solvent extraction system in which each copper ion exchange stage was preceded by an acid extraction stage except stage 1. The acid extractant used was a tertiary amine, N-benzyl-di(2-ethyl hexyl) amine. The analyses of the aqueous phase in each of the stages of the copper recovery are shown in Table 2.

TABLE 2

| Stage | Analysis of aqueous phase, g./l. | |
|---|---|---|
| | Copper | Sulfuric acid |
| 1 | 6.6 | 5.5 |
| 2 | 2.8 | 4.6 |
| 3 | .9 | 4.2 |
| 4 | .2 | 3.8 |

The results show that the removal of acid from each stage with the amine solvent substantially improve the recovery of copper, about 97 percent of the copper being recovered.

EXAMPLE II

A copper sulfate solution containing 5 g./l. Cu was used in a series of shakeout tests. This solution was contacted with 10% LIX-64 in kerosene at an organic to aqueous phase ratio of 5.0. After the first contact the raffinate was again contacted with a fresh solution of the solvent. This was repeated three times and the results are shown in Table 1.

TABLE 1
[Extraction of Cu with LIX-64]

| Contact | Extract, g./l. Cu | Aqueous, g./l. Cu | pH | Distribution coefficient |
|---|---|---|---|---|
| Feed | | 5.0 | 4.1 | |
| 1st | 0.59 | 2.02 | 1.3 | 0.29 |
| 2nd | 0.12 | 1.30 | 1.05 | 0.09 |
| 3rd | 0.05 | 1.07 | 1.00 | 0.05 |

It can be seen that as the pH becomes lower the solvent extracts a lesser amount of copper. This is reflected in the smaller distribution coefficient after each contact. The total Cu extracted was 78.6%.

The above test (Table 1) was repeated and after each contact with the copper extractant the raffinate was contacted with a 10% kerosene solution of Adogen 368 (a tertiary amine mixture of 8, 10 and 12 carbon chains), also containing 10% isodecanol to improve phase disengagement. The results are presented in Table 2.

TABLE 2
[Extraction of Cu with LIX-64 and intermediate contacts with Adogen 368]

| Contact | Extract, g./l. Cu | Aqueous, g./l. Cu | pH | Distribution coefficient |
|---|---|---|---|---|
| Feed | | 5.0 | 4.1 | |
| 1st LIX-64 | 0.59 | 2.08 | 1.3 | 0.28 |
| 1st Adogen | | | 3.0 | |
| 2nd LIX-64 | 0.28 | 0.69 | 1.2 | 0.41 |
| 2nd Adogen | | | 2.9 | |
| 3rd LIX-64 | 0.12 | 0.08 | | 1.5 |

When the results of Table 1 are compared with the results of Table 2, it can be seen that the higher pH in the aqueous solution results in higher extraction. Thus, after contacts with the LIX-64 between three stages, 98.4% of the Cu had been extracted.

EXAMPLE III

In the following example the feed solution used was a nitrate solution of rare earth metals having the following analysis:

| | Percent |
|---|---|
| $La_2O_3$ | 1.2 |
| $CeO_2$ | 2.0 |
| $Pr_6O_{11}$ | 3.4 |
| $Nd_2O_3$ | 18.0 |
| $Sm_2O_3$ | 48.1 |
| $Eu_2O_3$ | 1.1 |
| $Gd_2O_3$ | 17.7 |
| $Tb_4O_7$ | 0.9 |
| $Dy_2O_3$ | 1.3 |
| $Ho_2O_3$ | 0.6 |
| $Er_2O_3$ | 0.4 |
| $Tm_2O_3$ | Trace |
| $Yb_2O_3$ | 0.2 |
| $Lu_2O_3$ | Trace |
| $Y_2O_3$ | 5.1 |

An aqueous solution of rare earth nitrates was prepared containing 45.8 g./l. of $RE_2O_3$. This solution was contacted at a phase ratio of 1.0 with a 50% kerosene solution of a carboxylic acid known as Versatic 9-11 with a formula:

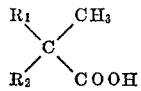

wherein $R_1$ and $R_2$ are hydrocarbon chains of three and four carbon atoms. The test was carried out in a manner similar to that described in Example II. The results are shown in Table 1. It can be seen that 10.26% of the total rare earths were extracted with this carboxylic acid.

TABLE 1

[Extraction of rare earths with Versatic 9-11]

| Contact | Extract, g./l. RE₂O₃ | Aqueous, g./l. RE₂O₃ | pH | Distribution coefficient |
|---|---|---|---|---|
| Feed | | 45.8 | 4.8 | |
| 1st | 3.0 | 42.8 | 1.0 | 0.07 |
| 2nd | 0.9 | 41.9 | 0.9 | 0.02 |
| 3rd | 0.8 | 41.1 | 0.9 | 0.02 |

The same aqueous feed was used for a test where the acid generated during the contact with the Versatic acid was extracted with the tertiary amine described in Example II (Adogen 368). The results are tabulated in Table 2 of Example III. It may be noticed that because of the intermediate extraction of the acid the total extraction of rare earths after three contacts was 16.6% as compared with the 10.26% obtained when no Adogen was used.

TABLE 2

[Extraction of rare earths with Versatic 9-11 and intermediate contacts with Adogen 368]

| Contact | Extract, g./l. RE₂O₃ | Aqueous, g./l. RE₂O₃ | pH | Distribution coefficient |
|---|---|---|---|---|
| Feed | | 45.8 | 4.8 | |
| 1st Versatic | 3.0 | 42.8 | 1.0 | 0.07 |
| 1st Adogen | | | 5.0 | |
| 2nd Versatic | 2.3 | 40.5 | | 0.06 |
| 2nd Adogen | | | 5.0 | |
| 3rd Versatic | 2.3 | 38.2 | | 0.06 |

The following example was performed to illustrate that reusable sulfuric acid can be effectively stripped from the solvent.

EXAMPLE IV

The Adogen 368 solvent was loaded with acid by contacting it with a 2 N sulfuric acid solution. The extract was then contacted several times at a phase ratio of 10.0 with plain water. The results presented in Table 1 show that the acid can be stripped from the extract to yield reusable sulfuric acid.

TABLE 1

[Stripping of sulfuric acid from a 10% kerosene solution of Adogen 368 loaded with sulfuric acid]

| Contact | Organic phase, g./l. H₂SO₄ | Aqueous phase, g./l. H₂SO₄ |
|---|---|---|
| Extract | 14.2 | |
| 1st | 11.3 | 28.6 |
| 2nd | 9.9 | 13.9 |
| 3rd | 9.2 | 7.3 |
| 4th | 8.7 | 4.6 |
| 5th | 8.4 | 3.2 |
| 6th | 8.2 | 2.4 |

Although the process of the invention is illustrated by its application in controlling the pH of leach solutions in which the metal ions being recovered happen to be copper or rare earth metals, it is not limited in its application to leach solutions containing any particular metal ion or ions as the metal ion present has no effect whatsoever on the removal of acid with the solvent. The process is effective for use in ion exchange processes in which ions of more than one metal are in solution, such as leach solutions formed from mixed metal ores provided the cation exchange agent is operative for the metals.

The invention is equally effective for recovery of acids in processes wherein recovery of pure acid free from metal compound impurities is the objective, the metal impurities being removed and the acid being recovered from solution by alternate treatment of the solution with cation exchange agent and acid solvent throughout the recovery process. As an example, the process has been found to be particularly effective in the recovery of phosphoric acid from phosphate ores.

I claim:

1. A process for the recovery of metal ions from solution with a hydrogen ion exchange agent which comprises: alternately contacting the solution with a hydrogen ion exchange agent to exchange hydrogen ions on the hydrogen ion exchange agent for the metal ions in solution and with a solvent extractant for hydrogen ions to remove hydrogen ions from the solution.

2. The process of claim 1 in which the pH is in the acid range when the solution is contacted with the solvent extractant and the solvent extractant is maintained in contact with the solution until the pH decreases.

3. The process of claim 1 in which the metal ion is selected from the group consisting of ions of copper and rare earth metals.

4. The process of claim 3 in which the hydrogen ion exchange agent is a 2-hydroxy benzophenoxime, and the metal ion is the copper ion.

5. The process of claim 3 in which the metal ion is a rare earth metal ion and the hydrogen ion exchange agent is a carboxylic acid.

6. A process for the recovery of metal ions from aqueous solutions with a hydrogen ion exchange agent which comprises: alternately contacting the solution with a hydrogen ion exchange agent to exchange hydrogen ions on the hydrogen ion exchange agent for the metal ions in solution until the pH of the aqueous solution reaches a given point so low that effective removal of more metal ions is substantially precluded and then contacting the aqueous solution with a solvent extractant for hydrogen ions in an organic phase until the pH of the aqueous solution reaches a given point so high that metal can be effectively recovered; and repeating the alternate contact of the aqueous solution with the hydrogen ion exchange agent and the solvent extractant until substantially all of the metal ion is removed from solution; stripping the metal and acid from the hydrogen ion exchange agent and the solvent extractant, respectively; and recovering the acid and the metal.

7. The process of claim 6 in which the metal ion is a member of the group consisting of copper and rare earth metal ions.

8. The process of claim 7 in which the hydrogen ion exchange agent is a 2-hydroxy benzophenoxime and the metal ions are copper ions.

9. The process of claim 6 in which the solvent extractant for hydrogen ions is an amine.

10. The process of claim 6 in which the pH of the aqueous solution is in the acid range when it is contacted with the solvent extractant for hydrogen ions.

11. In the process of recovering metal ions from aqueous solution in which the metal ions are exchanged for hydrogen ions on a hydrogen ion exchange agent, the improvement in controlling the pH of the solution without neutralizing the acid therein which comprises: alternately contacting the aqueous solution with a hydrogen ion exchange agent until the acidity of the aqueous solution is substantially increased and with a solvent extractant for acid until the acidity of the aqueous solution is substantially decreased; and repeating the alternate contact of the aqueous solution with hydrogen ion exchange agent and organic extractant until substantially all of the metal is recovered from the aqueous solution.

12. A continuous process for the recovery of a metal from its ore which comprises:

(a) leaching the ore with acid to form an aqueous solution containing ions of the metal;

(b) contacting the aqueous solution with a hydrogen ion exchange agent to exchange hydrogen ions on the hydrogen exchange agent for metal ions in solution until the pH of the aqueous solution reaches a given point;

(c) contacting the aqueous solution with a solvent extractant for hydrogen ions in an organic phase until the acidity is substantially decreased to a given point;

(d) repeating alternate contact of the aqueous solution with hydrogen ion exchange agent and solvent extractant until substantially all of the metal ions are removed from the aqueous solution;

(e) stripping acid from the organic extractant and returning it to the system to leach ore; and (f) stripping the metal from the hydrogen ion exchange agent and recovering it with the hydrogen ion exchange agent being purified for reuse.

References Cited

UNITED STATES PATENTS

| | | | |
|---|---|---|---|
| 3,479,378 | 11/1969 | Orlandini et al. | 75—117 |
| 3,211,526 | 10/1965 | Crouse | 23—172 |
| 3,514,267 | 5/1970 | Sherrington et al. | 23—19 R-X |
| 3,455,677 | 7/1969 | Litz | 23—19 R-X |
| 3,259,472 | 7/1966 | Rice | 23—22 X |
| 2,992,894 | 7/1961 | Hazen et al. | 75—101 BE UX |
| 3,333,924 | 8/1967 | Hazen et al. | 23—172 X |
| 3,558,288 | 1/1971 | Burrows | 75—101 BE UX |

GEORGE T. OZAKI, Primary Examiner

U.S. Cl. X.R.

75—101 BE, 117, 121; 23—19, 312 ME; 210—24, 38